(12) United States Patent
Hartung et al.

(10) Patent No.: US 8,729,207 B2
(45) Date of Patent: May 20, 2014

(54) TYPES OF POLYESTER-MODIFIED ORGANOPOLYSILOXANES

(75) Inventors: Christian Hartung, Essen (DE); Michael Ferenz, Essen (DE); Wilfried Knott, Essen (DE); Helmut Ritter, Wuppertal (DE); Michael Fiedel, Düsseldorf (DE)

(73) Assignee: Evonik Degussa GmbH, Essen (DE)

( * ) Notice: Subject to any disclaimer, the term of this patent is extended or adjusted under 35 U.S.C. 154(b) by 187 days.

(21) Appl. No.: 13/177,867

(22) Filed: Jul. 7, 2011

(65) Prior Publication Data

US 2012/0010302 A1 Jan. 12, 2012

(30) Foreign Application Priority Data

Jul. 8, 2010 (DE) .......................... 10 2010 031 087

(51) Int. Cl.
C08G 77/445 (2006.01)

(52) U.S. Cl.
USPC ................... 528/14; 528/26; 528/27; 528/38; 524/268

(58) Field of Classification Search
None
See application file for complete search history.

(56) References Cited

U.S. PATENT DOCUMENTS

| | | | |
|---|---|---|---|
| 3,778,458 A * | 12/1973 | Morehouse | 556/440 |
| 4,985,511 A * | 1/1991 | Wagener et al. | 525/474 |
| 6,858,663 B2 | 2/2005 | Knott et al. | |
| 7,196,153 B2 | 3/2007 | Burkhart et al. | |
| 7,598,334 B2 | 10/2009 | Ferenz et al. | |
| 7,605,284 B2 | 10/2009 | Brueckner et al. | |
| 7,612,158 B2 | 11/2009 | Burkhart et al. | |
| 7,612,159 B2 | 11/2009 | Burkhart et al. | |
| 7,619,035 B2 | 11/2009 | Henning et al. | |
| 7,635,581 B2 | 12/2009 | Ferenz et al. | |
| 7,645,848 B2 | 1/2010 | Knott et al. | |
| 7,727,599 B2 | 6/2010 | Doehler et al. | |
| 7,754,778 B2 | 7/2010 | Knott et al. | |
| 7,825,205 B2 | 11/2010 | Knott et al. | |
| 7,825,207 B2 | 11/2010 | Ferenz et al. | |
| 7,825,209 B2 | 11/2010 | Knott et al. | |
| 7,834,122 B2 | 11/2010 | Ferenz et al. | |
| 7,855,265 B2 | 12/2010 | Thum et al. | |
| 2002/0161158 A1 | 10/2002 | Burkhart et al. | |
| 2006/0155090 A1 | 7/2006 | Ferenz | |
| 2007/0128143 A1 | 6/2007 | Gruning et al. | |
| 2007/0197678 A1 | 8/2007 | Cavaleiro et al. | |
| 2008/0076842 A1 | 3/2008 | Ferenz et al. | |
| 2010/0022435 A1 | 1/2010 | Henning et al. | |
| 2010/0056649 A1 | 3/2010 | Henning et al. | |
| 2010/0056818 A1 | 3/2010 | Ferenz et al. | |
| 2010/0081763 A1 | 4/2010 | Meyer et al. | |
| 2010/0105843 A1 | 4/2010 | Knott et al. | |
| 2010/0113633 A1 | 5/2010 | Henning et al. | |
| 2010/0184913 A1 | 7/2010 | Ebbrecht et al. | |
| 2010/0249339 A1 | 9/2010 | Henning et al. | |
| 2010/0266651 A1 | 10/2010 | Czech et al. | |
| 2010/0292357 A1 | 11/2010 | Knott et al. | |
| 2010/0298455 A1 | 11/2010 | Henning et al. | |
| 2011/0021693 A1 | 1/2011 | Henning et al. | |
| 2012/0277394 A1 * | 11/2012 | Taniguchi et al. | 528/28 |

FOREIGN PATENT DOCUMENTS

JP 04-089822 A * 3/1992
WO WO 2011/052659 * 5/2011

OTHER PUBLICATIONS

"Ring-Opening Polymerization of the Trimethylcaprolactone Isomers and Investigations of their Polymerizability" authored by Zhou et al. and published in Macromolecules (2008) 41, 1663-1666.*

* cited by examiner

*Primary Examiner* — Marc Zimmer
(74) *Attorney, Agent, or Firm* — Frommer Lawrence & Haug LLP

(57) ABSTRACT

The invention relates to new types of polyester-polysiloxane block copolymers, to processes for their preparation and to their use.

13 Claims, No Drawings

TYPES OF POLYESTER-MODIFIED ORGANOPOLYSILOXANES

The invention relates to new types of polyester-polysiloxane block copolymers, to processes for their preparation and to their use.

Any foregoing applications [including German patent application DE, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

Organomodified siloxanes are used in a very wide variety of applications. Their properties can be adjusted in a targeted manner through the type of modification and also through the modification density.

Block copolymers can combine the properties of the individual polymer types within themselves and are therefore very interesting for many applications. Polyester-polysiloxane block copolymers are described for example in U.S. Pat. No. 4,663,413. To build up the polyester-polysiloxane block copolymers, use is made here exclusively of ε-caprolactone and linearly α,ω-modified siloxanes. The products are used as surface modifiers for other polymers. U.S. Pat. No. 3,778,458 describes the hydrosilylation of polyether-polyester copolymers. To produce the polyester segment, here likewise, exclusively ε-caprolactone is used. U.S. Pat. No. 5,194,473 describes the use of polyestersiloxanes in bioabsorbable materials for medicine. The polyester segment is based here on polymerization of lactide or glycolide. Lactones polysubstituted with side chains, such as e.g. 3,3,5-trimethylcaprolactone, are not described. Yilgör et al. (*Journal of Polymer Science (Part A: Polymer Chemistry)* 1989, Vol. 27, 3673-3690), Lovinger et al. (*Journal of Polymer Science (Part B: Polymer Physics)* 1993, Vol. 31, 115-123), Kricheldorf et al. (*Macromol. Biosci.* 2001, 1, 364-369) and Clarson et al. (*Silicon* 2009, 1, 165-172) describe the synthesis of polyester-polysiloxane block copolymers, which takes place as a result of the addition reaction of ε-caprolactone onto hydroxy-functional siloxanes.

Commercial products based on polyester-polysiloxane block copolymers also exist and are sold e.g. under the trade name TEGOMER® H-Si 6440 P (Evonik Goldschmidt GmbH, Germany). These are used for example as plastics additives.

The polyester-polysiloxane block copolymers prepared using industrially available lactones such as ε-caprolactone are wax-like or solid for polyester contents of ca. ≥50%. For certain applications, this may lead to problems in respect of formulatability. Moreover, these polyester-polysiloxane block copolymers based on e.g. ε-caprolactone usually have poor solubility (and/or do not dissolve to give clear solutions) in, for example, cosmetic oils such as $C_{12}$-$C_{15}$-alkyl benzoate. However, for effective applicability and usability, adequate compatibility with the respective medium, such as, for example, the cosmetic oil or the polymer to be modified, is necessary.

Compared to unsubstituted lactones such as ε-caprolactone, polysubstituted lactones with alkyl side chains (i.e. ≥2 alkyl side chains on the lactone ring) are very much more difficult to react to give polyesters. Steric reasons hinder the polymerization, and customary processes only achieve low conversions of lactone. Block copolymers with siloxanes are even more difficult to obtain on account of compatibility problems. For this reason, the literature contains no explicit investigations in respect of the reaction of siloxanes with polysubstituted lactones.

An industrially available lactone carrying multiple side chains is trimethylcaprolactone (3,3,5-trimethylcaprolactone CAS [2549-56-6] and 3,5,5-trimethylcaprolactone CAS [2549-57-7]). Hitherto, no polyester-polysiloxane block copolymers with trimethylcaprolactone are known. This can be explained by the fact that no polyester-polysiloxane block copolymers with trimethylcaprolactone can be prepared in high yields using the methods known hitherto.

However, the preparation of polyester-polysiloxane block copolymers with polysubstituted lactones such as trimethylcaprolactone would be desirable in order to arrive at products with new properties and compatibilities.

An object of the present invention was therefore to synthesize new types of polyester-modified siloxanes and to provide a process for their preparation, and also their use.

The object is achieved by the reaction of polysubstituted lactones, preferably trimethylcaprolactone, with siloxanes.

The invention provides polyester-polysiloxane block copolymers which have polysubstituted lactone monomer units. The substitution consists preferably of alkyl groups, particularly preferably of methyl groups and in particular the lactone monomer unit is a trimethylcaprolactone group.

The invention further provides a process for the preparation of the polyester-polysiloxane block copolymers according to the invention using polysubstituted lactones.

The invention further provides the use of polyester-polysiloxane block copolymers which have polysubstituted lactone monomer units, and consequently the provision of new application properties and compatibilities.

Moreover, in the synthesis of the products, sufficiently high conversions (>60%, preferably >70%, in particular >85%) of the lactones used should be achieved that unreacted lactone does not have to be distilled off as far as possible at the end of the reaction. Furthermore, the reaction should have a high selectivity (>70%, preferably >80%, in particular >90%) in respect of the polyester-polysiloxane block copolymer to be formed. For example, the formation of homopolymer (based on the lactone) should be suppressed since this can influence the properties of the polyester-polysiloxane block copolymer. For this, it is desirable to carry out the reaction under the mildest conditions possible, i.e. at temperatures of at most 110° C., preferably ≤100° C., in particular ≤90° C.

DESCRIPTION OF THE INVENTION

Surprisingly, an access to new types of polyester-polysiloxane block copolymers which contain polysubstituted lactones as monomer units has been found. Here, preference is given to polyester-polysiloxane block copolymers of the general formula (I). Compared to the known polyester-polysiloxane block copolymers, these exhibit unique properties. E.g. they have a low tendency towards crystallization, meaning that the products are completely amorphous or are characterized by a comparatively low melting point or melting range (<50° C.). Moreover, they have an improved compatibility with, for example, cosmetic oils, i.e. they are clearly and homogeneously soluble therein in amounts of at least 0.2%.

The invention further provides a process for the preparation of polyester-polysiloxane block copolymers with polysubstituted lactone monomer units. Here, OH-, NRH- or COOH-functional siloxanes are reacted with polysubstituted lactones such as trimethylcaprolactone and optionally further unsubstituted lactones such as ε-caprolactone and bismuth (III) triflate or methylaluminoxane (MAO) as catalyst.

A further subject matter is the use of polyester-polysiloxane block copolymers of the general formula (I) in cleaning and care formulations, as plastics and paint additives, and also in formulations in the agricultural sector.

The invention provides polyester-modified siloxanes which contain at least three polysubstituted lactone monomer units and optionally further unsubstituted or monosubstituted lactone monomer units. In a further embodiment of the invention, the polysubstituted lactone monomer units which are used for preparing the products may, independent of one another, be identical or different and are described by the general formula (0):

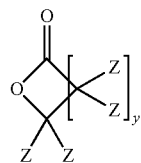

formula (0)

where

Z=independently of one another, identical or different linear or branched alkyl radicals having 1 to 6 carbon atoms or hydrogen, preferably methyl or hydrogen and y=1 to 5, preferably 2 to 4, in particular 4,
with the proviso that at least two of the radicals Z in formula (0) are alkyl radicals and not hydrogen and with the proviso that the lactone block is bonded to the siloxane backbone via SiC linkage.

A preferred subject matter of the invention is polyester-modified siloxanes of the general formula (I)

$M_{2+f+2g-a-b}M'_aM''_bD_cD'_dD''_eT_fQ_g$    formula (I)

where
$M=(R^1_3SiO_{1/2})$,
$M'=(R^1_2R^2SiO_{1/2})$,
$M''=(R^1_2R^3SiO_{1/2})$,
$D=(R^1_2SiO_{2/2})$,
$D'=(R^1R^2SiO_{2/2})$,
$D''=(R^1R^3SiO_{2/2})$,
$T=(R^1SiO_{3/2})$ and
$Q=(SiO_{4/2})$;
where
a=0 to 10, preferably 0 to 2, in particular 0,
b=0 to 15, preferably 0 to 10, in particular 0, 2 to 9,
c=0 to 350, preferably 5 to 250, in particular 10 to 150,
d=0 to 50, preferably 0 to 20, in particular 0 or 2 to 10,
e=0 to 100, preferably 0 to 50, in particular 0 or 3 to 30,
f=0 to 12, preferably 0 to 8, in particular 0 or 1 to 7 and
g=0 to 8, preferably 0 to 5, in particular 0 or 1 to 4, with the proviso that
b+e≥1
where
$R^1$=independently of the others, identical or different linear or branched, optionally aromatic hydrocarbon radicals having 1 to 30 carbon atoms, which optionally carry hydroxyl or ester functions, preferably methyl or phenyl, in particular methyl,
$R^2$=independently of the others, identical or different polyether radicals, or those radicals of the formula (II)

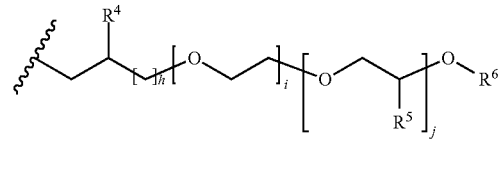

formula (II)

and
$R^3$=independently of the others, identical or different radicals of the general formulae (IIIa) or (IIIb)

-A(BC)$_k$    formula (IIIa),

-A(B'C')$_k$    formula (IIIb), where
C=independently of the others, identical or different polyester radicals of the formula (IV)

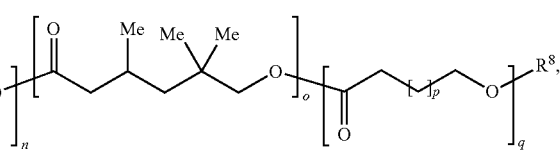

formula (IV)

B=independently of the others, identical or different divalent heteroatom groups, preferably a radical of the group
—O—, —NH—, —NR$^{14}$—,
A=independently of the others and identical or different, a (k+1)-valent organic radical, preferably a radical of the group:

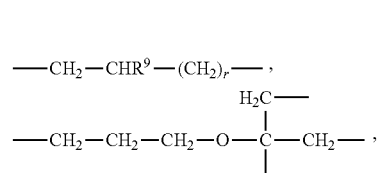

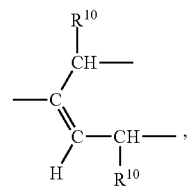

C'=independently of the others, identical or different polyester radicals of the formula (V)

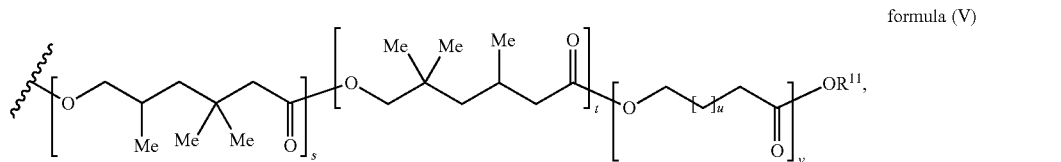

B'=independently of the others, identical or different divalent radicals containing carbonyl groups, preferably a radical of the group:

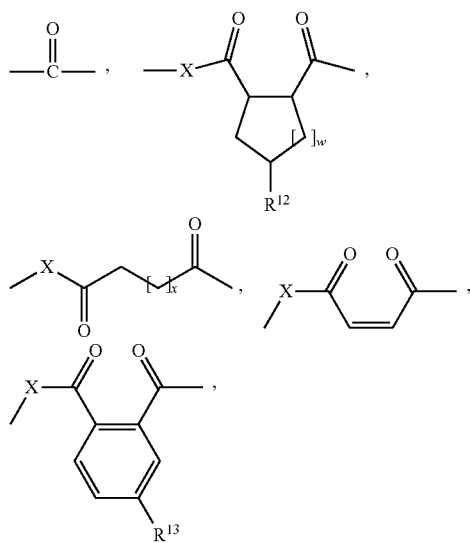

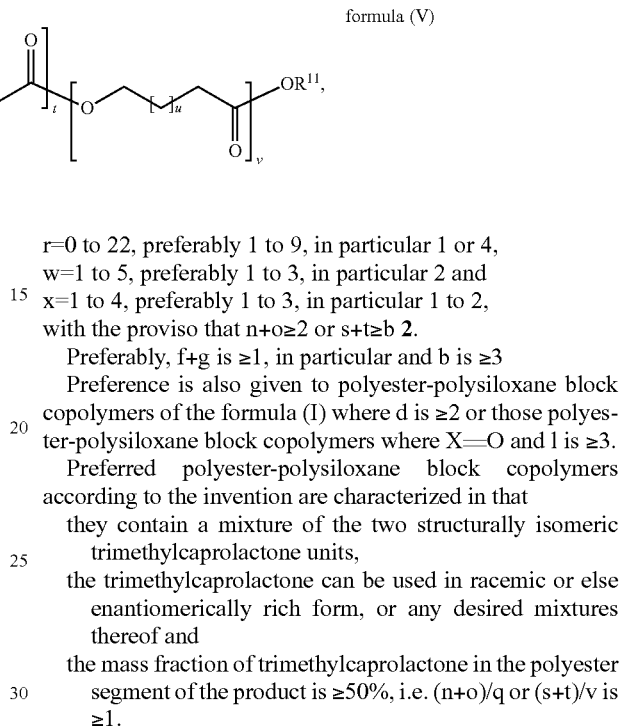

where
X=independently of the others and identical or different, O or NH, preferably oxygen O,
$R^4$, $R^9$=independently of one another, identical or different linear or branched alkyl radicals having 1 to 16 carbon atoms or hydrogen, preferably methyl or hydrogen, in particular hydrogen,
$R^5$, $R^7$=independently of one another, identical or different alkyl or aryl radicals, preferably methyl, ethyl or phenyl, in particular methyl,
$R^6$=independently of the others, identical or different, optionally branched alkyl radicals or an acyl radical, preferably methyl or acetyl,
$R^8$, $R^{10}$, $R^{11}$, $R^{12}$, $R^{13}$=independently of one another, identical or different linear or branched alkyl radicals having 1 to 16 carbon atoms or hydrogen, preferably methyl or hydrogen, in particular hydrogen, and
$R^{14}$=independently of the others, identical or different linear or branched alkyl radicals having 1 to 16 carbon atoms, in particular methyl;
and
h=0 to 22, preferably 0 to 9, in particular 1,
i=0 to 50, preferably 0 to 30, in particular 5 to 25,
j=0 to 50, preferably 0 to 30, in particular 0 to 25,
k=1 to 3, preferably 1 to 2, in particular 1,
l=0 to 50, preferably 0 to 30, in particular 0 or 4 to 15,
m=0 to 50, preferably 0 to 30, in particular 0,
n, o, s, t=0 to 50, preferably 1 to 30, in particular 2 to 20,
p, u=1 to 4, preferably 2 to 3, in particular 3,
q, v=0 to 50, preferably 0 to 30, in particular 2 to 20,
r=0 to 22, preferably 1 to 9, in particular 1 or 4,
w=1 to 5, preferably 1 to 3, in particular 2 and
x=1 to 4, preferably 1 to 3, in particular 1 to 2,
with the proviso that n+o≥2 or s+t≥b 2.
Preferably, f+g is ≥1, in particular and b is ≥3
Preference is also given to polyester-polysiloxane block copolymers of the formula (I) where d is ≥2 or those polyester-polysiloxane block copolymers where X=O and l is ≥3.
Preferred polyester-polysiloxane block copolymers according to the invention are characterized in that
they contain a mixture of the two structurally isomeric trimethylcaprolactone units,
the trimethylcaprolactone can be used in racemic or else enantiomerically rich form, or any desired mixtures thereof and
the mass fraction of trimethylcaprolactone in the polyester segment of the product is ≥50%, i.e. (n+o)/q or (s+t)/v is ≥1.
Preparation:
The invention further provides a process for reacting OH-, NRH- or COOH-functional silicone macroinitiators with trimethylcaprolactone and optionally further lactones to give polyester-polysiloxane block copolymers of the formula (I) with the help of the catalysts bismuth(III) triflate or methylaluminoxane (MAO).

The OH-, NRH- or COOH-functional silicone macroinitiators required for the reaction with the lactones can be prepared by hydrosilylation of SiH-functional siloxanes with corresponding OH-, NRH- or COOH-functional alkenes or alkynes. Furthermore, they can also be prepared by processes known to the person skilled in the art, such as esterification or saponification reactions, from suitable organomodified siloxanes.

The SiH-functional siloxanes used for the hydrosilylation are obtainable by the processes of equilibration known to the person skilled in the art, as described for example in U.S. Pat. No. 7,196,153. Branched siloxanes for the synthesis of the products from formula (I) where f+g≥1 are accessible specifically in accordance with the process described in the patent applications DE 10 2008 041601.0 and DE 10 2007 055485.2.

The hydrosilylation with functional olefins or alkynes can be carried out in accordance with established methods in the presence of a catalyst. Suitable methods for the hydrosilylation are described for example in the book "Chemie and Technologie der Silikone [Chemistry and Technology of Silicones]", Verlag Chemie, 1960, page 43, and also in U.S. Pat. No. 3,775,452 and EP 1520870, to which reference is expressly made.

Olefins which can be used for the hydrosilylation are, for example, 1-hexenol, allyloxyethanol, glycerol monoallyl ether, trimethylolpropane monoallyl ether, allyl alcohol, undecylenol, allylamine, n-allylethylenediamine, undecylenic acid, undecylenic acid methyl ester, undecylenic acid trimethylsilyl ester, acrylic acid alkyl esters, methacrylic acid alkyl esters, allyl polyethers or vinyl polyethers. Alkynes for the hydrosilylation may be, for example, but-2-yne-1,4-diol or 1,4-dimethylbut-2-yne-1,4-diol.

Optionally, the OH-, NHR- or COOR-functional siloxanes prepared in the hydrosilylation can be further reacted before the polyester build-up takes place.

The OH- or NHR-functional siloxanes can be reacted, for example, with cyclic acid anhydrides to give COOH-functional compounds. Suitable acid anhydrides are e.g. maleic anhydride, succinic anhydride, methylhexahydrophthalic anhydride or phthalic anhydride. The COOR-functional siloxanes can be converted, for example by saponification, to COOH-functional macroinitiators.

The reaction of the OH-, NHR- or COOH-functional siloxanes with trimethylcaprolactone and optionally further lactones takes place in the presence of a catalyst.

Catalysts which are described in the prior art are suitable. For example, tin(II) octoate is very often used. Tin compounds, however, are no longer desired in the future for (environmental) toxicological aspects. Moreover, relatively high temperatures are required for the reaction. Usually, temperatures of 110-160° C. are chosen.

Surprisingly, it has been found that the products according to the invention can be prepared with bismuth(III) triflate or methylaluminoxane (MAO) as catalysts in good yields (i.e. lactone conversions of >70%) and under mild conditions (<100° C.). The synthesis therefore particularly advantageously takes place in the presence of these catalysts at temperatures of ca. 80° C. in ca. 8-24 h.

In the process according to the invention, the starting materials are mixed with the catalyst and brought to reaction temperature. It may possibly be useful to mix the catalyst firstly with one starting material and only then to add the following starting materials. It may possibly be useful to alter the temperature during the reaction and to run a temperature profile. Moreover, it may be useful to pretreat the starting materials used with a method known to the person skilled in the art, such as, for example, a predrying. It may also possibly be useful to meter in individual starting materials gradually. The reaction can be carried out continuously, discontinuously or semicontinuously.

Bismuth(III) triflate is already catalytically active at low temperatures, i.e. at room temperature to 100° C. Moreover, only small amounts of bismuth(III) triflate are required as catalyst in order to arrive at good yields of the products according to the invention. Just 0.01-0.05 mol % of catalyst, based on the lactone or lactone mixture used, suffice to convert the starting materials within industrially acceptable reaction times. It is surprising for the person skilled in the art that bismuth(III) triflate does not bring about equilibration of the siloxane backbone.

The bismuth(III) triflate can be deactivated at the end of the reaction using simple methods. For example, complexing reagents can be added or the bismuth(III) triflate can be removed from the reaction mixture by adding precipitation reagents. Suitable precipitation reagents are e.g. thiourea, dithiouracil or ethyl thiooxamate.

Methylaluminoxane (MAO) is also particularly suitable as catalyst within the context of the invention. In particular, MAO is suitable for preparing products whose polyester segment consists exclusively of trimethylcaprolactone units and simultaneously has high conversions of lactone (>70%). MAO too is catalytically active even under mild conditions (80-90° C.). Surprisingly, MAO does not insert into the siloxane backbone. Moreover, MAO surprisingly does not effect equilibration of the siloxane backbone.

Application:

The invention further provides the use of the polyester-polysiloxane block copolymers according to the invention in cleaning and care formulations, as plastics and paint additives and in formulations for the agricultural sector.

Compared to polyester-polysiloxane block copolymers based on simple lactones such as ε-caprolactone or δ-valerolactone from the prior art, the products according to the invention have increased compatibility in many application systems. They can therefore satisfy very useful additive functions such as hardening, shine-improving or other surface-modifying properties within these applications.

Use in Cleaning and Care Formulations:

Cleaning and care formulations are used for example in cosmetics, for pharmaceutical applications and for applications for the homecare sector. Here, in most cases water-in-oil or oil-in-water emulsions are used. Additives such as silicones in these formulations can take on different tasks, for example they serve as emulsifiers or as additives for improving skin feel.

In oils such as cosmetic oils (emollients), silicone additives can contribute to lowering the surface tension, for improving distributability (spreading) and to improved skin feel. The compatibility of the silicone with the cosmetic oil is very important here.

Compared to simple polyester-polysiloxane block copolymers based on e.g. ε-caprolactone, the products according to the invention can surprisingly be incorporated into many formulations very much more easily and homogeneously. They are then able, in application, to bring about, for example, improved skin feel, improved spreading, increased emulsion stability and increased stabilization of pigments or UV absorbers.

The invention therefore further provides the use of the polyester-polysiloxane block copolymers according to the invention for producing cosmetic, dermatological or pharmaceutical formulations, and also for producing domestic or industrial care and cleaning compositions optionally comprising dispersed solids, in particular for hard surfaces, leather or textiles.

The cosmetic, dermatological or pharmaceutical compositions and formulations prepared with the help of the polyester-polysiloxane block copolymers according to the invention, and also the domestic or industrial care and cleaning compositions optionally containing dispersed solids and the care and cleaning compositions for hard surfaces, leather or textiles comprising at least one polyester-polysiloxane block copolymer according to the invention are likewise provided by the invention.

The invention also further provides the use of the compositions comprising the polyester-polysiloxane block copolymers according to the invention for producing formulations for the agricultural sector or as additives in paints or plastics.

The formulations according to the invention can comprise e.g. at least one additional component selected from the group of emollients, coemulsifiers and surfactants, thickeners/viscosity regulators/stabilizers, UV photoprotective filters, antioxidants, hydrotropes (or polyols), solids and fillers, film formers, pearlescent additives, deodorant and antiperspirant active ingredients, insect repellents, self-tanning agents, preservatives, conditioners, perfumes, dyes, cosmetic active ingredients, care additives, superfatting agents, solvents.

Substances which can be used as exemplary representatives of the individual groups are known to the person skilled in the art and can be found, for example, in the German application DE 10 2008 001788.4. This patent application is hereby incorporated by reference and thus forms part of the disclosure.

Preference is given to the use of polyester-polysiloxane block copolymers according to the invention for producing cosmetic or pharmaceutical formulations. Such formulations may be, for example, creams, lotions or sprays, such as, for example, care creams, baby creams or sunscreen lotions, ointments, antiperspirants, deodorants or make-up. In particular, the cosmetic formulations may also be formulations such as make-ups or sunscreen products which comprise dispersed solids such as, for example, iron oxide pigments, titanium dioxide or zinc oxide particles.

Formulations according to the invention can therefore be used as a skincare product, face care product, head care product, body care product, intimate care product, foot care product, hair care product, nail care product, dental care product or mouth care product.

Formulations according to the invention can be used in the form of an emulsion, a suspension, a solution, a cream, an ointment, a paste, a gel, an oil, a powder, an aerosol, a stick or pencil, a spray, a cleaning product, a make-up or sunscreen preparation or a face toner.

Further subject matters of the invention arise from the claims, the disclosure content of which is in its entirety subject matter of the description of this invention.

The polyester-modified siloxanes according to the invention are described below by way of example without intending to limit the invention to these exemplary embodiments. Where ranges, general formulae or compound classes are given below, then these are intended to encompass not only the corresponding ranges or groups of compounds which are explicitly mentioned, but also all part ranges and part groups of compounds which can be obtained by removing individual values (ranges) or compounds. Where documents are cited in the course of the present description, then it is the intention for their content, in its entirety, to form part of the disclosure content of the present invention. If, in the course of the present invention, compounds such as e.g. organomodified polysiloxanes are described which can have different units a number of times, then these occur within these compounds in random distribution (random oligomer) or in an arranged manner (block oligomer). Data relating to the number of units in such compounds is to be understood as meaning average values, averaged over all of the corresponding compounds. Unless stated otherwise, percentages (%) are percentages by mass.

The examples listed below describe the present invention by way of example without any intention to limit the invention and its scope of application to the embodiments specified in the examples.

EXAMPLES

Chemicals Used

Siloxane Macroinitiators:
Siloxane A: α,ω-OH-functional Siloxane N=30:
Prepared according to established methods (see for example EP 1 520 870) by Pt-catalyzed hydrosilylation of an α,ω-siloxane (siloxane chain length N=30) with 1-hexenol and subsequent vacuum distillation.
Hydroxy number (OHN) of the product: 47.6 mg KOH/g.
Siloxane B: α,ω-OH-Functional Siloxane N=80:
Prepared according to established methods by Pt-catalyzed hydrosilylation of an α,ω-SiH-siloxane (siloxane chain length N=80) with 1-hexenol and subsequent vacuum distillation.
OHN: 19.2 mg KOH/g.

Siloxane C: α,ω- and Comb-Position-OH-Functional Siloxane:
Prepared according to established methods by Pt-catalyzed hydrosilylation of an SiH-siloxane of the formula $Me_2HSiO$-$(Me_2SiO)_{13}$-$(MeHSiO)_5$—$SiHMe_2$ with 1-hexenol and subsequent vacuum distillation.
OHN: 187.0 mg KOH/g.
Siloxane D: Comb-Position Polyether-Functional Siloxane:
Prepared according to established methods by Pt-catalyzed hydrosilylation of an SiH-siloxane of the formula $Me_3SiO$-$(Me_2SiO)_{13}$-$(MeHSiO)_5$—$SiMe_3$ with 1.3 equivalents of an allyl polyether of the formula $H_2C=CH-CH_2-(OCH_2CH_2)_{13}-OH$.
OHN: 89.0 mg KOH/g.
Siloxane E: α,ω-$NH_2$-Functional Siloxane N=30:
Prepared according to established methods by tetramethylammonium hydroxide-catalyzed equilibration of 1,3-bis(3-aminopropyl)-1,1,3,3-tetramethyldisiloxane (CAS [2469-55-8], ABCR) with octamethylcyclotetrasiloxane (D4, ABCR).
Nitrogen content of the product: 1.3%.
Siloxane F: α,ω-COOH-Functional Siloxane N=30:
Prepared according to established methods from siloxane A by reaction with 4-methylhexahydrophthalic anhydride.
Acid number (AN): 43 mg KOH/g.

The siloxane macroinitiators A-F are in each case weighed into the reaction vessel and freed from volatile constituents (including water) resulting from production for ca. 30 minutes at $5 \cdot 10^{-2}$ mbar in an oil pump vacuum.

Further Reagents:
3,5,5-Trimethylcaprolactone/3,3,5-trimethylcaprolactone (=TMCL, CAS [2549-56-6] and [2549-57-7], Evonik Degussa GmbH) and ε-caprolactone (=eCL, Acros): stirred for 24 h over $CaH_2$, then distilled off and stored under argon.
Bismuth(III) trifluoromethanesulphonate 99% (Aldrich), CAS [88189-03-1]
Tin(II) octoate 95% (Aldrich), CAS [301-10-0]
Methylaluminoxane 10% by weight in toluene (=MAO, Aldrich), CAS [120144-90-3], d=0.875 g/cm³
Thiourea 99% (Aldrich), CAS [62-56-6]
Dithiouracil 98% (Aldrich), CAS [2001-93-6]
Ethyl thiooxamate 95% (Aldrich), CAS [16982-21-19]
Dithizone 99% (Aldrich), CAS [60-10-6]

Analysis:
500 MHz $^1$H-NMR spectra, 125 MHz $^{13}$C-NMR spectra and 79.5 MHz $^{29}$Si-NMR spectra were recorded using a Bruker Avance DRX 500. The referencing of the ppm scale was carried out here with the help of the solvent signal of $CDCl_3$ at 7.24 ppm and 77.0 ppm or by adding TMS (0 ppm) in the case of the recording of $^{29}$Si-NMR spectra.

DSC measurements were carried out using a Mettler DSC-822 instrument in a temperature range from −50 to 200° C. at a heating rate of 10° C./min. Tin, indium and zinc standards were used for the calibration.

GPC measurements were carried out using THF (HPLC grade, unstabilized, Biosolv) as eluent at room temperature with a flow rate of 1 ml/min on a system consisting of a pump from FLOW, model Intelligent Pump AL-12, and a sample collector from Schambeck SFD, model S5200. Here, a pre-column of porosity 100 Å and three main columns "Gel Sdplus" from MZ Analysentechnik GmbH were used which have porosities of 10 000, 1000 and 100 Å and consist of a styrene-divinylbenzene copolymer. A degasser from Schambeck, type Gastorr 150, is connected upstream. The detectors used were a Waters 486 Turnable Absorbance Detector and a Schambeck SFD RI2000 differential refractometer. Calibration was carried out with polystyrene standard in the range from 570 to 3 114 000 daltons. Toluene was added as internal standard.

Example 1

Preparation of a Polyester(PES)-Polydimethylsiloxane (PDMS)-Polyester(PES)-Triblock Polymer [PES-b-PDMS-b-PES] by Means of Ring-Opening Polymerization (ROP) of eCL/TMCL (20 mol/OH—50/50) Started on a Hydroxyalkyl-Functionalized Siloxane (Siloxane A) with Tin Catalysis 75.0 g (32.2 mmol) of siloxane A (OHN 47.6 mg/g), 73.5 g (643.9 mmol) of ε-caprolactone and 100.6 g (643.9 mmol) of trimethylcaprolactone (isomer mixture) are stirred under inert conditions in a 500 ml four-neck flask equipped with reflux condenser, precision-ground glass stirrer, internal thermometer and argon introduction. The reaction mixture prepared in this way is heated to 150° C., then 1.3 g (3.2 mmol) of tin(II)octoate (0.25 mol % based on lactone or 0.5% by weight ad total mixture) are added and the mixture is stirred for a further 8 hours at 150° C. When the reaction is complete, the mixture is freed from all volatile constituents at 80° C. in an oil pump vacuum ($5 \cdot 10^{-2}$ mbar). A viscous, slightly yellowish polymer is obtained. According to GPC (THF) the molar mass distribution is: Mw=10 734 g/mol and Mn=7272 g/mol. DSC analyses in the temperature range from −50 to 200° C. indicate a completely amorphous behaviour of the polymer. The $^1H/^{13}C/^{29}Si$-NMR spectra correspond to expectations.

Example 2

Preparation of a [PES-b-PDMS-b-PES] Triblock Polymer by Means of ROP of eCL/TMCL (20 mol/OH—60/40) Started on a Hydroxyalkyl-Functionalized Siloxane (Siloxane A) with Tin Catalysis as Described in Example 1

77.6 g (32.9 mmol) of siloxane A (OHN 47.6 mg/g)
90.2 g (790.3 mmol) of ε-caprolactone
82.3 g (526.8 mmol) of trimethylcaprolactone (isomer mixture)
1.3 g (3.2 mmol) of tin(II) octoate [0.5% by weight ad total mixture]

According to GPC (THF), the molar mass distribution is: Mw=11 932 g/mol and Mn=9214 g/mol. DSC analyses in the temperature range from −50 to 200° C. indicate a completely amorphous behaviour of the polymer.
The $^1H/^{13}C/^{29}Si$-NMR spectra correspond to expectations.

Example 3

Preparation of a [PES-b-PDMS-b-PES] Triblock Polymer by Means of ROP of eCL/TMCL (20 mol/OH—70/30) Started on a Hydroxyalkyl-Functionalized Siloxane (Siloxane A) with Tin Catalysis as Described in Example 1

79.3 g (33.7 mmol) of siloxane A (OHN 47.6 mg/g)
107.6 g (942.7 mmol) of ε-caprolactone
63.1 g (403.9 mmol) of trimethylcaprolactone (isomer mixture)
1.3 g (3.2 mmol) of tin(II) octoate [0.5% by weight ad total mixture]

According to GPC (THF), the molar mass distribution is: Mw=12 344 g/mol and Mn=9014 g/mol. DSC analyses in the temperature range from −50 to 200° C. indicate a partially crystalline behaviour of the polymer with a melting range of 7-35° C., a peak maximum at 29° C. and a melting enthalpy of 36 J/g.
The $^1H/^{13}C/^{29}Si$-NMR spectra correspond to expectations.

Example 4

Preparation of a [PES-b-PDMS-b-PES] Triblock Polymer by Means of ROP of eCL/TMCL (20 mol/OH—50/50) Started on a Hydroxyalkyl-Functionalized Siloxane (Siloxane A) with Bismuth Catalysis 75.0 g (32.2 mmol) of siloxane A (OHN 47.6 mg/g) are introduced as initial charge in a 500 ml four-neck flask equipped with reflux condenser, precision-ground glass stirrer, internal thermometer and argon introduction under inert conditions, and 422.6 mg (0.64 mmol) of the Bi catalyst (0.05 mol % based on lactone) are added. The mixture is stirred at 80° C. until the catalyst has completely dissolved. A mixture of 73.5 g (643.9 mmol) of ε-caprolactone and 100.6 g (644.0 mmol) of trimethylcaprolactone (isomer mixture) is then added and the mixture is stirred for a further 8 hours at 80° C.*
*Possible deactivation of the catalyst:
When the reaction is complete, the mixture is freed from all volatile constituents at 80° C. in an oil pump vacuum ($5 \cdot 10^{-2}$ mbar). A viscous, slightly cloudy polymer is obtained. According to GPC (THF), the molar mass distribution is: Mw=7005 g/mol and Mn=4596 g/mol. DSC analyses in the temperature range from −50 to 200° C. indicate a completely amorphous behaviour of the polymer. The $^1H/^{13}C/^{29}Si$-NMR spectra correspond to expectations.
Deactivation by Means of Precipitation Reagent:
When the reaction is complete, ca. 97.4 mg (1.3 mmol) of thiourea (double excess based on catalyst) are added and the mixture is then stirred for a further 3 hours. The reaction mixture is left to cool, taken up in 250 ml of chloroform and filtered repeatedly until the filtrate is clear. The solvent is then drawn off on a rotary evaporator and the mixture is freed from further volatile constituents at 80° C. and $5 \cdot 10^{-2}$ mbar in an oil pump vacuum. A viscous, slightly yellowish-cloudy polymer is obtained. According to GPC (THF), the molar mass distribution is: Mw=7106 g/mol and Mn=4498 g/mol.

Example 5

Preparation of a [PES-b-PDMS-b-PES] Triblock Polymer by Means of ROP of eCL/TMCL (20 mol/OH—50/50) Started on a Hydroxyalkyl-Functionalized Siloxane (Siloxane A) with Methylaluminoxane Catalysis (MAO)

250 ml of toluene are introduced as initial charge in a 1 l four-neck flask equipped with reflux condenser, precision-ground glass stirrer, internal thermometer and argon introduction, and 75.0 g (32.2 mmol) of siloxane A (OHN 47.6 mg/g), 73.5 g (643.9 mmol) of ε-caprolactone and 100.6 g (644.0 mmol) of trimethylcaprolactone (isomer mixture) are added under inert conditions. The reaction mixture prepared in this way is rendered inert again and heated to 80° C., then 7.5 g (12.9 mmol MAO) of methylaluminoxane preparation (10% by weight in toluene), corresponding to 1 mol % based on total amount of lactone, are added and the mixture is stirred for 24 h at 80° C. When the reaction is complete, the solvent is removed on a rotary evaporator.*

* Possible deactivation of the catalyst:

A post-distillation at 80° C. in an oil pump vacuum ($5 \cdot 10^{-2}$ mbar) is then used to free the mixture from all volatile constituents. A viscous, slightly cloudy polymer is obtained. According to GPC (THF), the molar mass distribution is: Mw=18 816 g/mol and Mn=12 618 g/mol. DSC analyses in the temperature range from −50 to 200° C. indicate a completely amorphous behaviour of the polymer. The $^1H/^{13}C/^{29}Si$-NMR spectra correspond to expectations.

After the toluene has been distilled off, the residue is taken up in the same volume of chloroform which has been acidified beforehand with a few drops of conc. hydrochloric acid (10 drops/500 ml). Rapid extraction by shaking in the separating funnel destroys the catalyst complex, which can be filtered off. Excess acid is captured by re-extracting by shaking with dilute potassium hydrogencarbonate solution and the solvent is removed following prior filtration on a rotary evaporator.

Example 6

Preparation of a [PTMCL-b-PDMS-b-PTMCL] Triblock Polymer by Means of ROP of TMCL (40 mol/OH) Started on a Hydroxyalkyl-Functionalized Siloxane (Siloxane A) with Methylaluminoxane Catalysis (MAO)

250 ml of toluene are introduced as initial charge in a 1 l four-neck flask equipped with reflux condenser, precision-ground glass stirrer, internal thermometer and argon introduction, and 39.7 g (16.8 mmol) of siloxane A (OHN 47.6 mg/g) and 210.3 g (1.35 mol) of trimethylcaprolactone (isomer mixture) are added under inert conditions. The reaction mixture prepared in this way is rendered inert again and heated to 80° C., then 7.8 g or 8.9 ml (13.5 mmol) of methylaluminoxane preparation (10% by weight in toluene), corresponding to 1 mol % based on the total amount of lactone, are added and the mixture is stirred for 24 h at 80° C. When the reaction is complete, the solvent is removed on a rotary evaporator. A post-distillation at 80° C. in an oil pump vacuum ($5 \cdot 10^{-2}$ mbar) is then used to free the mixture from all volatile constituents. A highly viscous, slightly cloudy polymer is obtained. According to GPC (THF), the molar mass distribution is: Mw=18 816 g/mol and Mn=12 618 g/mol. DSC analyses in the temperature range from −50 to 200° C. indicate a completely amorphous behaviour of the polymer. The $^1H/^{13}C/^{29}Si$-NMR spectra correspond to expectations.

Example 7

Preparation of a [PES-b-PDMS-b-PES] Triblock Polymer by Means of ROP of eCL/TMCL (20 mol/OH—50/50) Started on a Hydroxyalkyl-Functionalized Siloxane (Siloxane B) with Tin Catalysis 129.9 g (22.2 mmol) of siloxane B (OHN 19.2 mg/g), 50.7 g (444.2 mmol) of ε-caprolactone and 69.4 g (444.2 mmol) of trimethylcaprolactone (isomer mixture) are stirred under inert conditions in a 500 ml, four-neck flask equipped with reflux condenser, precision-ground glass stirrer, internal thermometer and argon introduction. The reaction mixture prepared in this way is heated to 150° C., then 0.9 g (2.2 mmol) of tin(II) octoate (0.25 mol % based on lactone or 0.36% by weight ad total mixture) is added and the mixture is stirred for a further 8 hours at 150° C. When the reaction is complete, the mixture is freed from all volatile constituents at 80° C. in an oil pump vacuum ($5 \cdot 10^{-2}$ mbar). A viscous, slightly cloudy-yellowish polymer is obtained. According to GPC (THF), the molar mass distribution is: Mw=17 221 g/mol and Mn=11 495 g/mol. DSC analyses in the temperature range from −50 to 200° C. indicate a completely amorphous behaviour of the polymer. The $^1H/^{13}C/^{29}Si$ NMR spectra correspond to expectations.

Example 8

Preparation of a Polyester-Modified Siloxane by Means of ROP of eCL/TMCL (5 mol/OH—50/50) Started on a Hydroxyalkyl-Functionalized Siloxane (Siloxane C) with Tin Catalysis 76.9 g (32 mmol) of siloxane C(OHN 187 mg KOH/g), 73.1 g (640.4 mmol) of ε-caprolactone and 100.1 g (640.8 mmol) of trimethylcaprolactone (isomer mixture) are stirred under inert conditions in a 500 ml four-neck flask equipped with reflux condenser, precision-ground glass stirrer, internal thermometer and argon introduction. The reaction mixture prepared in this way is heated to 150° C., then 1.3 g (3.2 mmol) of tin(II) octoate (0.25 mol % based on lactone or 0.5% by weight ad total mixture) are added and the mixture is stirred for a further 8 hours at 150° C. When the reaction is complete, the mixture is freed from all volatile constituents at 80° C. in an oil pump vacuum ($5 \cdot 10^{-2}$ mbar). Here, 34 g of distillate and a viscous, slightly yellowish polymer are obtained. According to GPC (THF), the molar mass distribution is: Mw=35 336 g/mol and Mn=6149 g/mol. The $^1H/^{13}C/^{29}Si$ NMR spectra correspond to expectations.

Example 9

Preparation of a Polyester-Modified Siloxane by Means of ROP of eCL/TMCL (20 mol/OH—50/50) Started on a Hydroxyalkyl-Functionalized Siloxane (Siloxane C) with Tin Catalysis 25 g (10.4 mmol) of siloxane C(OHN 187 mg KOH/g), 95.0 g (832.3 mmol) of ε-caprolactone and 130.0 g (832.2 mmol) of trimethylcaprolactone (isomer mixture) are stirred under inert conditions in a 500 ml four-neck flask equipped with reflux condenser, precision-ground glass stirrer, internal thermometer and argon introduction. The reaction mixture prepared in this way is heated to 150° C., then 1.3 g (3.2 mmol) of tin(II) octoate (0.25 mol % based on lactone or 0.5% by weight ad total mixture) are added and the mixture is stirred for a further 8 hours at 150° C. When the reaction is complete, the mixture is freed from all volatile constituents at 80° C. in an oil pump vacuum ($5 \cdot 10^{-2}$ mbar). Here, 42 g of distillate and a viscous, slightly yellowish polymer are obtained. According to GPC (THF): the molar mass distribution is: Mw=37 383 g/mol and Mn=9746 g/mol. The $^1H/^{13}C/^{29}Si$ NMR spectra correspond to expectations.

Example 10

Preparation of a [PES-b-PDMS-b-PES] Triblock Polymer with Carboxy end Groups by ROP of eCL/TMCL (20 mol/OH—50/50) Started on a Carboxyalkyl-functionalized Siloxane (Siloxane F) with Tin Catalysis 81.4 g (31.2 mmol) of a carboxy-functionalized siloxane (siloxane F) (AN 43 mg KOH/g), 71.2 g (623.8 mmol) of ε-caprolactone and 97.4 g (623.7 mmol) of trimethylcaprolactone (isomer mixture) are stirred under inert conditions in a 500 ml four-neck flask equipped with reflux condenser, precision-ground glass stirrer, internal thermometer and argon introduction. The reaction mixture prepared in this way is heated to 150° C., then 1.3 g (3.2 mmol) of tin(II) octoate (0.25 mol % based on lactone or 0.5% by weight ad total mixture) are added and the mixture is stirred for a further 8 hours at 150° C. When the reaction is complete, the mixture is freed from all volatile constituents at 80° C. in an oil pump vacuum ($5 \cdot 10^{-2}$ mbar). Here, a highly viscous, slightly yellowish polymer is obtained. According to GPC (THF), the molar mass distribution is: Mw=10 124 g/mol and Mn=7801 g/mol. The $^1H/^{13}C/^{29}Si$ NMR spectra correspond to expectations.

Example 11

Preparation of a [PES-b-PDMS-b-PES] Triblock Polymer by Means of ROP of eCL/TMCL (20 mol/OH—50/50) Started on an Aminoalkyl-Functionalized Siloxane (Siloxane E) with Tin Catalysis 71.2 g (33.1 mmol) of siloxane E (N content: 1.3% by weight), 75.5 g (661.3 mmol) of ε-caprolactone and 103.3 g (661.3 mmol) of trimethylcaprolactone (isomer mixture) are stirred under inert conditions in a 500 ml four-neck flask equipped with reflux condenser, precision-ground glass stirrer, internal thermometer and argon introduction. The reaction mixture prepared in this way is heated to 150° C., then 1.3 g (3.2 mmol) of tin(II) octoate (0.25 mol % based on lactone or 0.5% by weight ad total mixture) are added and the mixture is stirred for a further 8 hours at 150° C. When the reaction is complete, the mixture is freed from all volatile constituents at 80° C. in an oil pump vacuum ($5 \cdot 10^{-2}$ mbar). Here, 44.7 g of distillate and a viscous, slightly yellowish polymer are obtained. According to GPC (THF), the molar mass distribution is: Mw=11 100 g/mol and Mn=5760 g/mol. The $^1H/^{13}C/^{29}Si$ NMR spectra correspond to expectations.

Example 12

Preparation of a Comb-Position Polyester-Modified Siloxane by Means of ROP of eCL/TMCL (20 mol/OH—50/50) Started on a Polyether-Modified Siloxane (Siloxane D) with Tin Catalysis 92.1 g (29.2 mmol) of siloxane D (OHN 89 mg KOH/g), 66.7 g (584.4 mmol) of ε-caprolactone and 91.3 g (584.4 mmol) of trimethylcaprolactone (isomer mixture) are stirred under inert conditions in a 500 ml four-neck flask equipped with reflux condenser, precision-ground glass stirrer, internal thermometer and argon introduction. The reaction mixture prepared in this way is heated to 150° C., then 1.3 g (3.22 mmol) of tin(II) octoate (0.25 mol % based on lactone or 0.5% by weight ad total mixture) are added and the mixture is stirred for a further 8 hours at 150° C. When the reaction is complete, the mixture is freed from all volatile constituents at 80° C. in an oil pump vacuum ($5 \cdot 10^{-2}$ mbar). Here, 43.5 g of distillate are obtained. In addition, a viscous, slightly yellowish polymer is obtained. According to GPC (THF), the molar mass distribution is: Mw=11 244 g/mol and Mn=3959 g/mol. The $^1H/^{13}C/^{29}Si$ NMR spectra correspond to expectations.

Comparative Example 13

Not According to the Invention

Preparation of a [PES-b-PDMS-b-PES] Triblock Polymer by Means of ROP of eCL (15 mol/OH) Started on a Hydroxyalkyl-Functionalized Siloxane (Siloxane A) with Tin Catalysis 55.9 g (24.0 mmol) of siloxane A (OHN 47.6 mg/g) and 82.2 g (720.2 mmol) of ε-caprolactone are stirred under inert conditions in a 500 ml four-neck flask equipped with reflux condenser, precision-ground glass stirrer, internal thermometer and argon introduction. The reaction mixture prepared in this way is heated to 150° C., then 0.7 g (2.2 mmol) of tin(II) octoate (0.5% by weight ad total mixture) is added and the mixture is stirred for a further 8 hours at 150° C. When the reaction is complete, the mixture is freed from all volatile constituents at 80° C. in an oil pump vacuum ($5 \cdot 10^{-2}$ mbar). After cooling, a crystalline, slightly yellowish polymer is obtained which exhibits a melting range of 50-62° C. According to GPC (THF), the molar mass distribution is: Mw=13 601 g/mol and Mn=7111 g/mol. The $^1H/^{13}C/^{29}Si$ NMR spectra correspond to expectations.

Comparative Example 14

Not in Accordance with the Invention

Preparation of a [PES-b-PDMS-b-PES] Triblock Polymer by Means of ROP of eCL (20 mol/OH) Started on a Hydroxyalkyl-Functionalized Siloxane (Siloxane B) with Tin Catalysis 140.4 g (24.0 mmol) of siloxane B (OHN 19.2 mg/g) and 109.6 g (960.6 mmol) of ε-caprolactone are stirred under inert conditions in a 500 ml four-neck flask equipped with reflux condenser, precision-ground glass stirrer, internal thermometer and argon introduction. The reaction mixture prepared in this way is heated to 150° C., then 1.3 g (2.2 mmol) of tin(II) octoate (0.5% by weight ad total mixture) are added and the mixture is stirred for a further 8 hours at 150° C. When the reaction is complete, the mixture is freed from all volatile constituents at 80° C. in an oil pump vacuum ($5 \cdot 10^{-2}$ mbar). After cooling, a crystalline, slightly yellowish polymer is obtained which, according to DSC analyses in the temperature range from −50 to 200° C., exhibits a melting range of 50-58° C. According to GPC (THF), the molar mass distribution is: Mw=17 603 g/mol and Mn=10 731 g/mol. The $^1H/^{13}C/^{29}Si$ NMR spectra correspond to expectations.

Application Examples

In oils such as cosmetic oils (emollients), silicone additives can contribute to the lowering of the surface tension and thus to better distributability and improved skin feel. The dispersion properties may also be thereby improved. The compatibility of the silicone with the cosmetic oil is an important prerequisite here.

Compared to simple polyester-polysiloxane block copolymers based on caprolactone, the products according to the invention can be readily incorporated and dissolved in a series of cosmetic oils (see Table 1).

TABLE 1

Solubility of selected polyester siloxanes according to the invention in a series of cosmetic oils (INCI nomenclature):

| Polyester siloxane | Aggregate state at 25° C. | Solubility 0.2% in diethylhexyl carbonate [a] | Solubility 0.2% in C$_{12-15}$ alkyl benzoate [b] | Solubility 0.2% in caprylic/capric triglyceride [c] | Solubility 0.2% in PPG-14 butyl ether [d] |
|---|---|---|---|---|---|
| Example 1 | Liquid, amorphous | Clearly soluble | Clearly soluble | Clearly soluble | Insoluble |
| Example 6 | Liquid, amorphous | Clearly soluble | Clearly soluble | Clearly soluble | Clearly soluble |
| Example 7 | Paste-like, amorphous | Clearly soluble | Almost clearly soluble, opaque | Clearly soluble | Insoluble |
| Comparative Example 13 | Solid, crystalline | Insoluble | Insoluble | Insoluble | Insoluble |
| Comparative Example 14 | Solid, crystalline | Insoluble | Insoluble | Insoluble | Insoluble |

[a] Diethylhexyl Carbonate: Tegosoft ® DEC (Evonik Goldschmidt GmbH),
[b] C$_{12-15}$ Alkyl Benzoate: Tegosoft ® TN (Evonik Goldschmidt GmbH),
[c] Caprylic/Capric Triglyceride: Tegosoft ® CT (Evonik Goldschmidt GmbH),
[d] PPG-14 Butyl Ether: Tegosoft ® PBE (Evonik Goldschmidt GmbH).

Table 1 clearly shows that the polyestersiloxanes 1, 6 and 7 according to the invention with a proportion of TMCL in the polyester block have good compatibility with a series of cosmetic oils. Comparative Examples 13 and 14, which are based on polyester blocks with exclusively eCL, by contrast, are insoluble in all four cosmetic oils.

As a result of the fact that the examples according to the invention are soluble in the cosmetic oils, the spreading of the oil on the skin is noticeably improved compared to the pure oil and compared to the mixture with Comparative Example 13 or 14.

Having thus described in detail various embodiments of the present invention, it is to be understood that the invention defined by the above paragraphs is not to be limited to particular details set forth in the above description as many apparent variations thereof are possible without departing from the spirit or scope of the present invention.

What is claimed is:

1. Polyester-polysiloxane copolymers characterized in that a trimethylcaprolactone is used for building up the polyester block and are compounds of the general formula (I)

$$M_{2+f+2g-a-b}M'_a M''_b D_c D'_d D''_e T_f Q_g \quad \text{formula (I)}$$

where
M=(R$^1_3$SiO$_{1/2}$),
M'=(R$^1_2$R$^2$SiO$_{1/2}$),
M''=(R$^1_2$R$^3$SiO$_{1/2}$),
D=(R$^1_2$SiO$_{2/2}$),
D'=(R$^1$R$^2$SiO$_{2/2}$),
D''=(R$^1$R$^3$SiO$_{2/2}$),
T=(R$^1$SiO$_{3/2}$) and
Q=(SiO$_{4/2}$);
where
a=0 to 10,
b=0 to 15,
c=0 to 350,
d=0 to 50,
e=0 to 100,
f=0 to 12,
g=0 to 8,
with the proviso that
b+e≥1 where
R$^1$=independently of the others, identical or different linear or branched, optionally aromatic hydrocarbon radicals having 1 to 30 carbon atoms, which optionally carry hydroxyl or ester functions,
R$^2$=independently of the others, identical or different polyether radicals, or those radicals of the formula (II)

formula (II)

[chemical structure showing R$^4$, R$^5$, R$^6$ with subscripts h, i, j]

and
R$^3$=independently of the others, identical or different radicals of the general formulae (IIIa) or (IIIb)

-A(BC)$_k$     formula (IIIa),

-A(B'C')$_k$     formula (IIIb), where
C=independently of the others, identical or different polyester radicals of the formula (IV)

formula (IV)

[chemical structure showing R$^7$, R$^8$ with subscripts l, m, n, o, p, q and Me groups]

B=independently of the others, identical or different divalent heteroatom groups;

A=independently of the others and identical or different, a (k+1)-valent organic radical;
C'=independently of the others, identical or different polyester radicals of the formula (V)

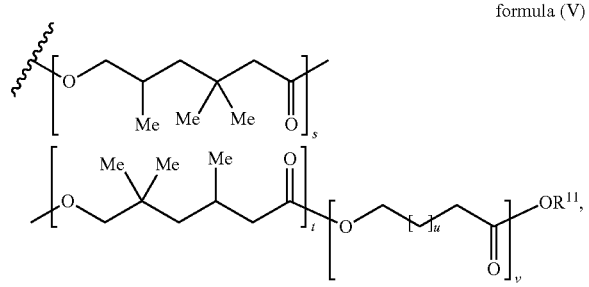

formula (V)

B'=independently of the others, identical or different divalent radicals containing carbonyl groups,

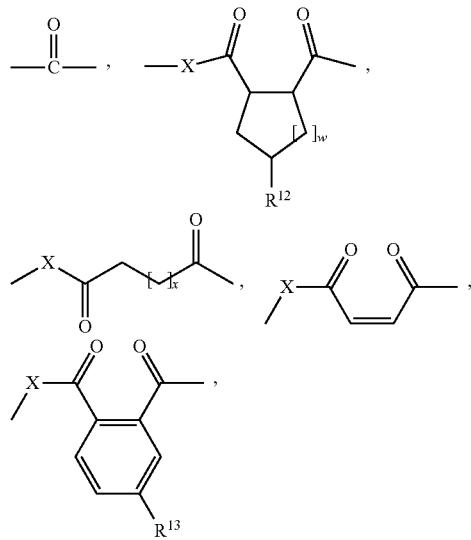

where
X=independently of the others and identical or different, O or NH, preferably oxygen O,
$R^4$ is a linear or branched alkyl radicals having 1 to 16 carbon atoms or hydrogen,
$R^5$, $R^7$=independently of one another, identical or different alkyl or aryl radicals,
$R^6$=independently of the others, identical or different, optionally branched alkyl radicals or an acyl radical,
$R^8$, $R^{11}$=independently of one another, identical or different linear or branched alkyl radicals having 1 to 16 carbon atoms or hydrogen, preferably methyl or hydrogen, in particular hydrogen, and
and
h=0 to 22,
i=0 to 50,
j=0 to 50,
k=1 to 3,
l=0 to 50,
m=0 to 50,
n, o, s, t=0 to 50,
p, u=1 to 4,
q, v=0 to 50, with the proviso that
n+o≥2 or s+t≥2.

2. Polyester-polysiloxane copolymers according to claim 1, formula (I) wherein n+o is greater than q and wherein s+t is greater than v.

3. Polyester-polysiloxane copolymers according to claim 1, characterized in that f+g≥1 and b≥3.

4. Polyester-polysiloxane copolymers according to at least one of claims 1 to 3 where d is ≥2.

5. A process for the preparation of polyester-polysiloxane copolymers according to claim 1, characterized in that OH-, NRH- or COOH-functional silicone macroinitiators are reacted with trimethylcaprolactone to give polyester-polysiloxane block copolymers of the formula (I) with the help of catalysts.

6. The process of claim 5 characterized in that the catalyst used is methylaluminoxane MAO or bismuth(III) triflate.

7. Compositions comprising polyester-polysiloxane copolymers according to at least one of claims 1 to 3.

8. Polyester-polysiloxane copolymers according to claim 1, characterized in that
$R^1$ is methyl or phenyl;
B is a radical of the group —O—, —NH— or —NR$^{14}$— wherein
$R^{14}$=independently of the others, identical or different linear or branched alkyl radicals having 1 to 16 carbon atoms;
A is a radical selected from the group consisting of

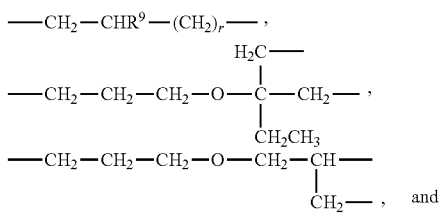

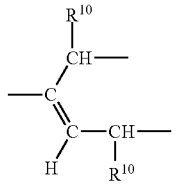

wherein
$R^9$, $R^{10}$=independently of one another, identical or different linear or branched alkyl radicals having 1 to 16 carbon atoms or hydrogen,
r=0 to 22;
B' is a radical selected from the groups consisting of

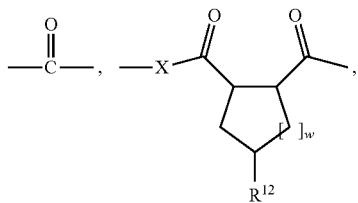

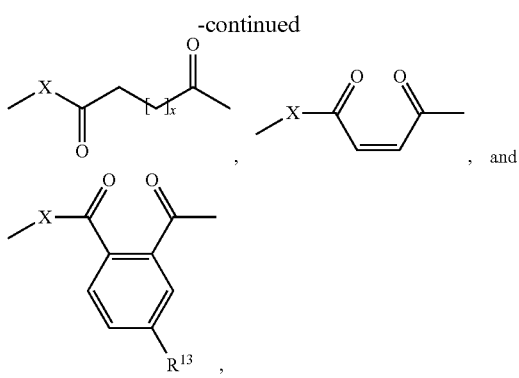

wherein,

X=independently of the others and identical or different, O or NH;

$R^{12}$, $R^{13}$=independently of one another, identical or different linear or branched alkyl radicals having 1 to 16 carbon atoms or hydrogen;

w=1 to 5; and x=1 to 4;

$R^4$ is methyl or hydrogen, $R^5$, $R^7$=independently of one another, identical or different, is methyl, ethyl or phenyl;

$R^6$=independently of the others, identical or different, is methyl or acetyl;

$R^8$, $R^{11}$=independently of one another, identical or different, is methyl or hydrogen;

h=0 to 9,
i=0 to 30,
j=0 to 30,
k=1 to 2,
l=0 to 30,
m=0 to 30,
n, o, s, t=1 to 30,
p, u=2 to 3,
q, v=0 to 30.

9. Polyester-polysiloxane copolymers according to claim 8, characterized in that $R^9$, $R^{10}$=independently of one another, identical or different, is methyl or hydrogen, $R^{12}$, $R^{13}$=independently of one another, identical or different, is methyl or hydrogen;

$R^{14}$=is methyl;

X is oxygen;

r=1 to 9,
w=1 to 3 and
x=1 to 3.

10. Polyester-polysiloxane copolymers according to claim 9, wherein X=O and l is ≥3.

11. A method of improving the formulatability of a formulation containing a polyester-polysiloxane copolymer which comprises adding the polyester-polysiloxane copolymers of claim 1 during formation of the formulation.

12. The method of claim 11, wherein the formulation is cosmetic, dermatalogical, pharmaceutical, dispersed-solids containing care, cleaning composition, agricultural, paint or plastic.

13. Polyester-polysiloxane copolymers according to claim 1 comprising at least three polysubstituted lactone monomer units.

* * * * *